(12) United States Patent
Hassan et al.

(10) Patent No.: US 7,733,130 B2
(45) Date of Patent: Jun. 8, 2010

(54) SKEW TOLERANT COMMUNICATION BETWEEN RATIOED SYNCHRONOUS CLOCKS

(75) Inventors: Mahmudul Hassan, San Carlos, CA (US); Tzungren Allan Tzeng, San Jose, CA (US)

(73) Assignee: Oracle America, Inc., Redwood Shores, CA (US)

( * ) Notice: Subject to any disclaimer, the term of this patent is extended or adjusted under 35 U.S.C. 154(b) by 0 days.

(21) Appl. No.: 12/043,935

(22) Filed: Mar. 6, 2008

(65) Prior Publication Data

US 2009/0225915 A1 Sep. 10, 2009

(51) Int. Cl.
*H03K 19/096* (2006.01)

(52) U.S. Cl. .......................... 326/96; 327/142; 327/145

(58) Field of Classification Search ......... 327/141–163; 375/354–376; 713/322, 400–401, 500–503, 713/600–601; 326/93
See application file for complete search history.

(56) References Cited

U.S. PATENT DOCUMENTS

| 5,694,556 | A | 12/1997 | Neal et al. | |
|---|---|---|---|---|
| 6,044,207 | A | 3/2000 | Pecone et al. | |
| 6,049,887 | A * | 4/2000 | Khandekar et al. | 713/503 |
| 6,128,669 | A | 10/2000 | Moriarty et al. | |
| 6,226,704 | B1 | 5/2001 | Wang et al. | |
| 6,320,436 | B1 | 11/2001 | Fawcett et al. | |
| 6,748,039 | B1 | 6/2004 | Bates | |
| 7,084,685 | B2 | 8/2006 | Lin et al. | |
| 2007/0076830 | A1 * | 4/2007 | Hasan et al. | 375/354 |

OTHER PUBLICATIONS

Motorola, Inc., Semiconductor Technical Data, "Dynamic Switch PLL Clock Driver," Sep. 1997, pp. 1-6.

* cited by examiner

*Primary Examiner*—Vibol Tan
*Assistant Examiner*—Jany Tran
(74) *Attorney, Agent, or Firm*—Rory D. Rankin; Meyertons Hood Kivlin Kowert & Goetzel, P.C.

(57) ABSTRACT

A data communications system is disclosed. The data communications system comprises two clock domains. Each of the clock domains are coupled to receive a source clock signal. The first clock domain includes a first clock signal and the second clock domain includes a second clock signal, each of the first clock signal and the second clock signal are derived from the source clock signal. The first clock signal has a frequency which is different from that of the second clock signal. The system includes circuitry configured to generate a pulse indicative of when data transferred between the first clock domain and the second clock domain may be latched. Data is only latched when the pulse is asserted and on a given edge of the first clock signal, and the circuitry is configured to generate the pulse such that the given edge occurs at approximately a position corresponding to a middle of a period of the second clock signal.

17 Claims, 11 Drawing Sheets

REPLACEMENT SHEET

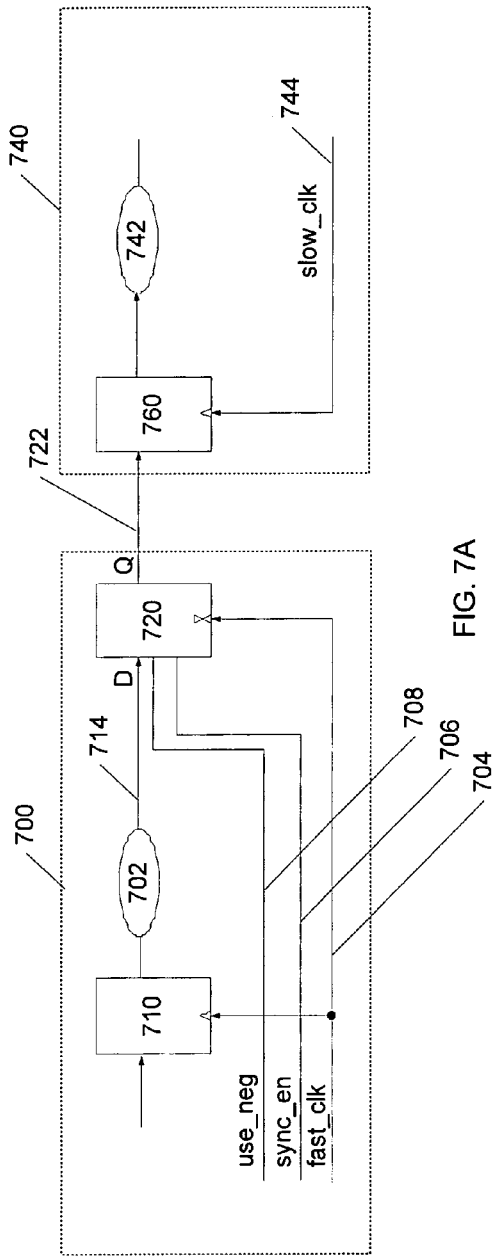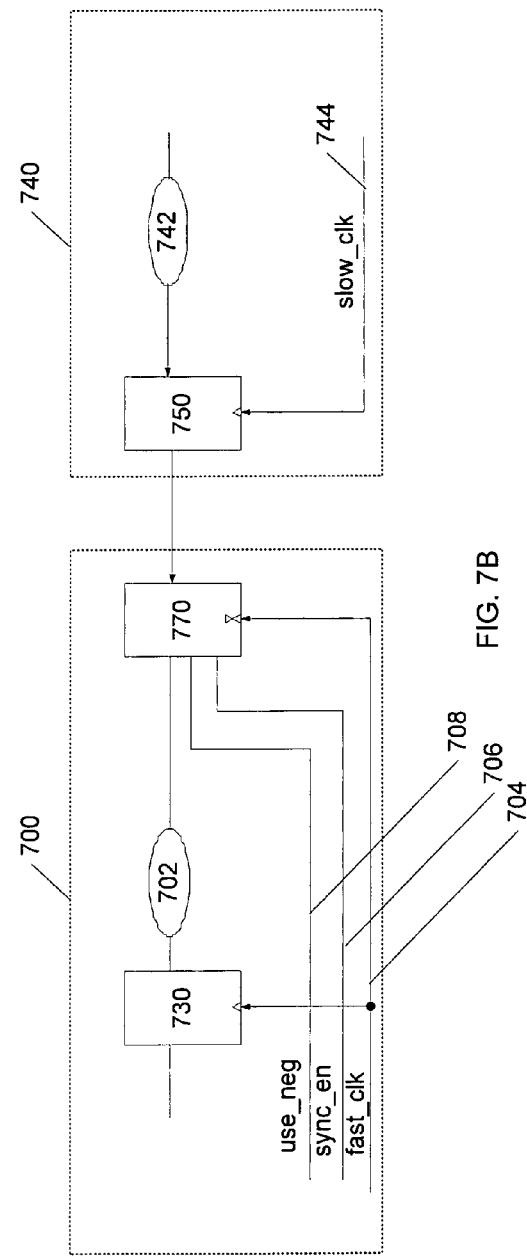
FIG. 7A
FIG. 7B

SKEW TOLERANT COMMUNICATION BETWEEN RATIOED SYNCHRONOUS CLOCKS

BACKGROUND OF THE INVENTION

1. Field of the Invention

This invention relates to multi-clock domain digital data communication and, more particularly, to detecting the alignment of multiple clock signals.

2. Description of the Related Art

New techniques to ensure the reliability of the communication of digital data have become necessary as the speed of communication links has increased. Particularly within computer memory systems, a reference clock may accompany parallel digital data so as to provide a mechanism for determining the appropriate time to sample the data. However, it is often the case that multiple clock domains are established within a given communications system due to the difficulties involved in distributing a single clock throughout a large system. Although the clocks of each individual clock domain may or may not have the same frequency, it is to be expected that the phase relationship between any two clocks in different domains will vary depending on changes in voltages and temperature between the domains over time. Jitter in the phase offset between a transmitting clock and a receiving clock tends to move the sampling point away from the ideal point in the received data signal, resulting in poor timing margins and/or a higher bit-error-rate (BER). The higher the speed at which a communications link is clocked, the more significant the effects of phase jitter become.

For example, assume a system where two clocks, fast_clk and slow_clk are generated from two phase locked loops (PLLs) but from a single reference, ref_clk. The PLL's would typically be placed several millimeters apart from each other to avoid coupling and noise issues, and the two clocks will inevitably have significant inter clock skew with respect to a common coincident edge. In some cases, 2-port SRAM based FIFO's may be used as a brute force solution. However, FIFO design can be tricky and difficult to prove 0% failure across all logical and physical conditions. Also, the complexity and area overhead of SRAM FIFO's can be overkill for clocks that maintain a simple, periodic (if skewed) relationship with each other.

In addition, if the ratio of the clock frequencies across a given boundary is not an integral multiple, determining when the respective clocks are aligned can be difficult. Therefore, it is desirable to have a mechanism to determine when to sample the data across a clock boundary while maintaining a robust timing margin thereby reducing the impact of phase changes between clock domains and enabling higher communication speeds. Still further, it can be important to pick a point in time "deterministically" when one or more ratioed synchronous clocks are aligned, especially when it pertains to domain crossing between such clocks.

In view of the above, methods and mechanisms for performing high bandwidth, deterministic, skew tolerant domain crossing between ratioed synchronous clocks are desired.

SUMMARY OF THE INVENTION

Various embodiments of a data communications system are disclosed. In one embodiment, the data communications system comprises two clock domains across which communications may occur. Each of the clock domains are coupled to receive a source clock signal. The first clock domain includes a first clock signal and the second clock domain includes a second clock signal, each of the first clock signal and the second clock signal are derived from the source clock signal. The first clock signal has a frequency which is different from that of the second clock signal. The system includes circuitry configured to generate a pulse indicative of when data transferred between the first clock domain and the second clock domain may be latched. Data is only latched when the pulse is asserted and on a given edge of the first clock signal, and the circuitry is configured to generate the pulse such that the given edge occurs at approximately a position corresponding to a middle of a period of the second clock signal.

Embodiments are also contemplated wherein the data is only latched when the pulse is asserted and on a given edge of the first clock signal, and wherein the circuitry is configured to generate the pulse such that the given edge occurs at approximately a position corresponding to a middle of a period of the second clock signal. In various embodiments, the data is latched on only a positive or negative edge of the first clock signal, but not both.

Also contemplated are embodiments wherein the system includes circuitry configured to generate an additional pulse. In such embodiments, when both the pulse is asserted and the additional pulse is not asserted, data is always latched on a same edge of the first clock signal, either a positive edge or a negative edge. Further, when both the pulse and said additional pulse are asserted, data is latched on an edge different from said same edge. Included in the system may be a sync pulse generator configured to generate the pulse, wherein the sync pulse generator includes a counter configured to repeatedly count a given number of cycles of the first clock signal and detect when selected counts occur. In contemplated embodiments where a ratio of the first frequency to the second frequency is N:M, the given number of cycles corresponds to N, and the number of selected counts detected corresponds to M.

These and other embodiments are contemplated and will be appreciated upon reference to the following description and accompanying figures.

BRIEF DESCRIPTION OF THE DRAWINGS

FIG. 7A illustrates one embodiment of multiple clock domain system.

FIG. 7B illustrates one embodiment of multiple clock domain system.

Figure 1:
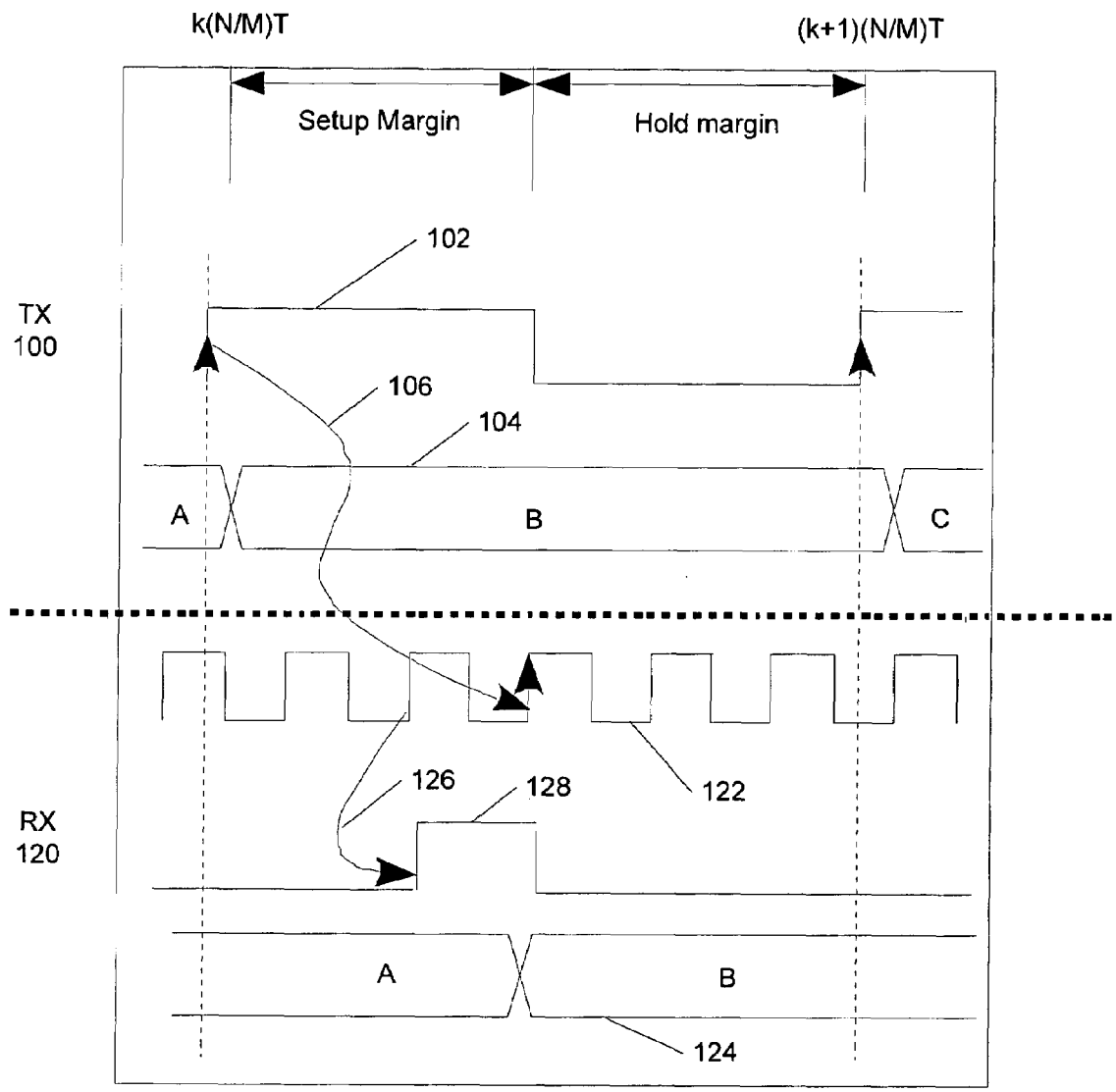
FIG. 1 depicts one embodiment of latching data across clock boundaries.

While the invention is susceptible to various modifications and alternative forms, specific embodiments are shown by way of example in the drawings and are herein described in detail. It should be understood, however, that drawings and detailed descriptions thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, a variety of parameters are discussed and included in the accompanying figures. For purposes of convenience, Table 1 below is provided to define the various parameters used throughout.

| Parameter | Description |
| --- | --- |
| $T_{ref}$ | ref_clk period (Period of common reference to both PLLs) |
| T | fast_clk period |
| $T_{slow}$ | slow_clk period |
| N | Frequency multiplier for fast_clk ($T_{ref}$ = NT) |
| M | Frequency multiplier for slow_clk ($T_{ref}$ = M$T_{slow}$) |
| k | An arbitrary slow_clk cycle count within one ref_clk period. ($0 \leq k < M$) |
| $t_{setup}$ | Setup time of capture or RX flop |
| $t_{hold}$ | Hold time of capture or RX flop |
| $t_{cq}$ | Clock-Q time of latch or TX flop |
| $t_{skew}$ | Total uncertainty between fast_clk and slow_clk (including, e.g., skew, clock tree jitter, and PLL jitter) |
| $t_{prop}$ | Propagation-delay of data while crossing domains |
| $t_{margin}$ | Time interval between data latch and clock capture edge under ideal conditions. (Ignores $t_{setup}$, $t_{hold}$, $t_{cq}$, $t_{prop}$ and $t_{skew}$) |
| $t_{margin,setup}$ | Actual margin for setup after accounting for parameters that constraint maximum data delay |
| $t_{margin,hold}$ | Actual margin for hold after accounting for parameters that constraint minimum data delay |

In one embodiment of a system including multiple clock domains and clock crossing boundaries, a pulse may be generated that allows data to cross domains within "safe zones". In such an embodiment, pulses are generated in such a manner that they are maximally tolerant of skew between the two clocks. Such an approach could, for example, be used in a microprocessor where the processor core and memory clock frequency ratios have different values, e.g., 2:1, 9:4, and 21:2. If there is an adequate margin, it may be possible to use only positive clock edges. For example, ratios of 2:1 or larger may have adequate margin to utilize such an approach. On the other hand, if the ratio of clocks is a fraction between 1 and 2, margins may not be adequate to simply use positive edges, and an approach using both positive and negative edges may be used.

In the following discussion, various embodiments are described wherein at least one of the following conditions is true:

1. There is a single, off-chip, crystal oscillator or clock source; or
2. There is a single, on-chip, PLL or single reference to both clock domain PLL's for generating their respective clocks.

We return now to the example discussed above of two PLLs which generate a faster clock (fast_clk) and a slower clock (slow_clk). In the described embodiments, the approach calls for approximately equal margins for setup and hold requirements (i.e., the goal is to approach or reach tmargin, setup=tmargin,hold). In one embodiment, a sync pulse position closest to the middle of the slow_clk may be used for either a fast to slow domain transfer, or a slow to fast domain transfer. The result is that the same sync pulse can be used for both directions of transfer. Additionally, the symmetric nature may require half as many lines to distribute, and may also be easier to account for during static timing analysis. Further, using this approach may be relatively tolerant of large skew in either direction.

FIG. 1 illustrates a timing diagram of one embodiment of a data crossing for any arbitrary cycle of a slow clock domain. In FIG. 1, both a slower domain 100 including a slow clock 102, and a faster domain 120 including a fast clock 122 are shown. Fast domain 100 is also shown to include data signal(s) 104, and slow domain 120 is shown to include data signals(s) 124. In this example, a sync pulse 128 (triggered by the rising edge of fast clock 122 shown by arrow 126) is shown to be approximately in the middle of the slow clock 102. Arrow 106 shows that responsive to the rising edge of clock 102, and the presence of the pulse 128, the fast domain 120 captures the data ("B") on the rising edge of the fast clock 122.

Figure 2:
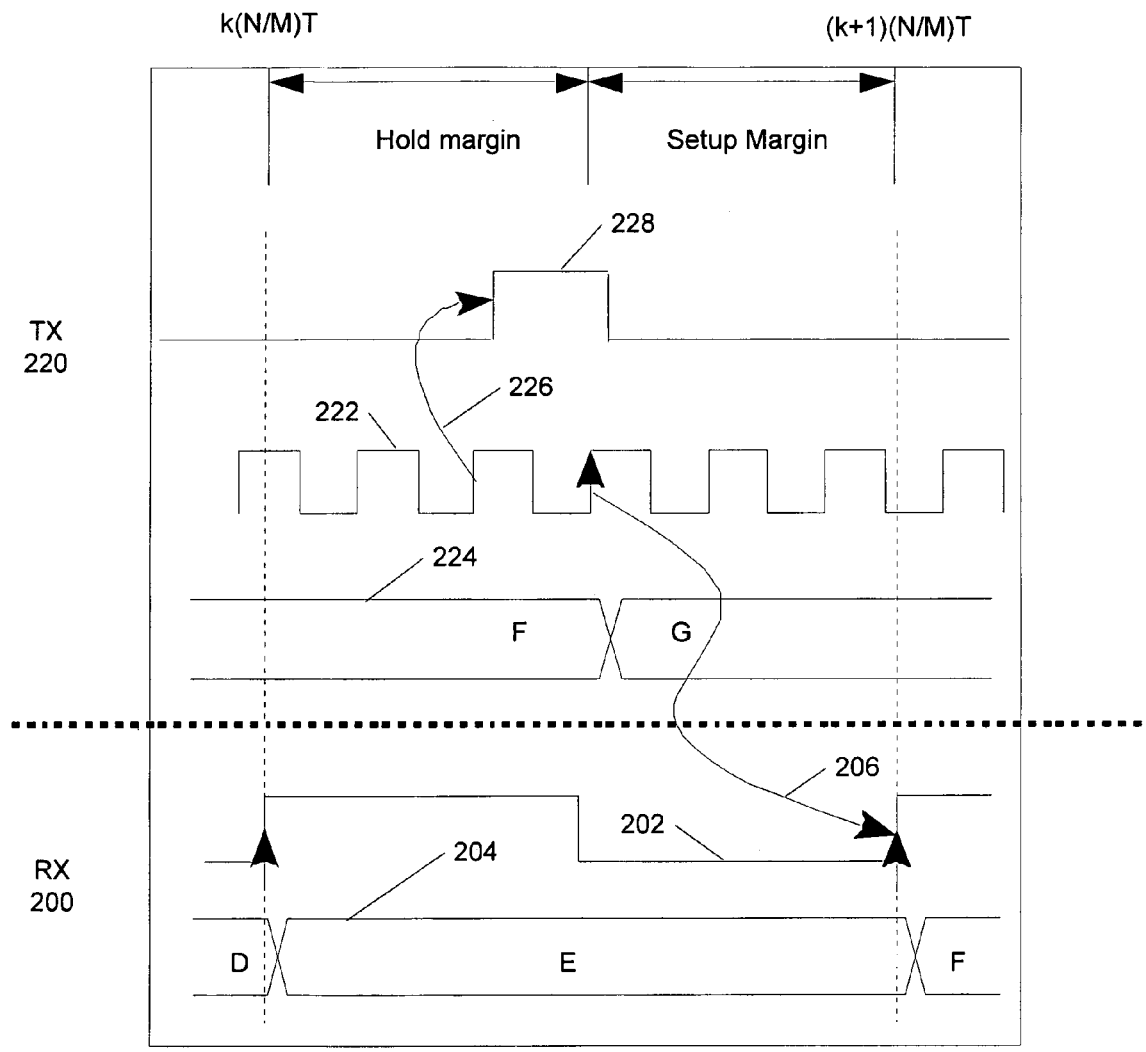
FIG. 2 depicts one embodiment of latching data across clock boundaries.

Similar to FIG. 1, a data transfer from a fast domain 220 to slow domain 200 using this approach is depicted in FIG. 2. Similar to FIG. 1, fast domain 220 includes a fast clock 222 and data signal(s) 224. Also shown is a sync pulse 228. Slow domain 200 is shown to include slow clock 202 and data signal(s) 204. Here a data transfer of data "F" from the fast domain 220 to the slow domain 200 is shown. As before, a sync pulse 228 is generated at a point near the middle of the slow clock 202 period. This sync pulse is triggered 226 by the rising edge of the fast clock. The following rising edge is then shown to trigger 206 the capture of the data "F" on the next rising edge of the slow clock 202.

Figure 3A:
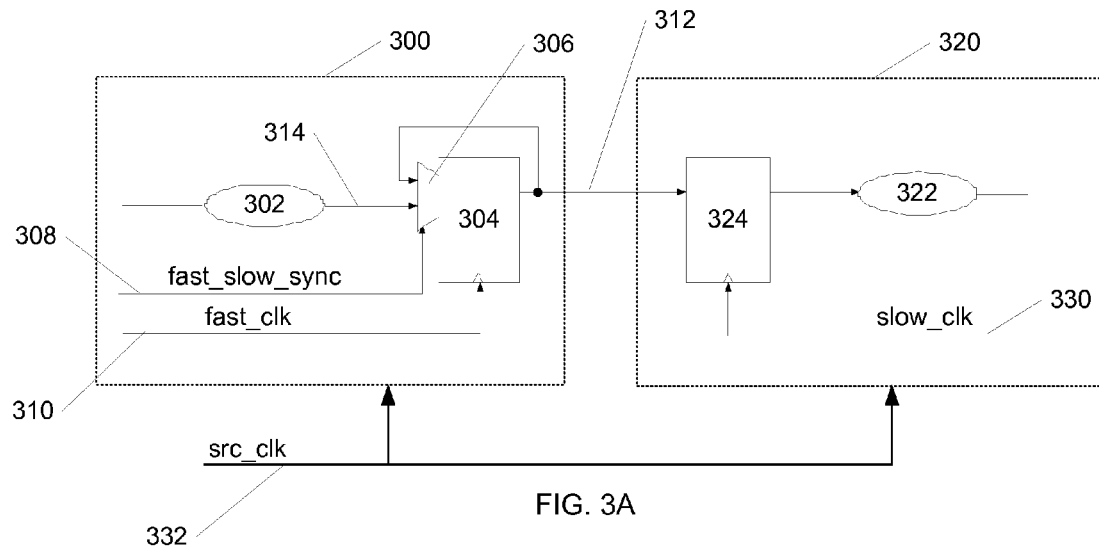
FIG. 3A illustrates one embodiment of multiple clock domain system.
Figure 3B:
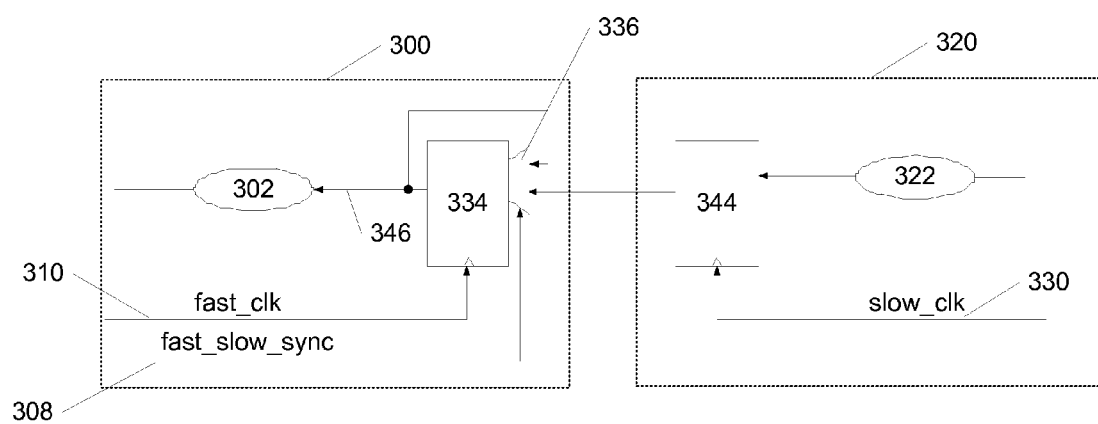
FIG. 3B illustrates one embodiment of multiple clock domain system.

As noted above, the same sync pulse may be used whether crossing from the fast to slow clock domain, or vice-versa. In an embodiment wherein only one edge (e.g., the positive edge) of the fast_clk is used, a multiplexor and flip-flop may be utilized as shown in FIGS. 3A-3B. FIG. 3A shows a block diagram illustrating a fast domain to slow domain crossing which generally corresponds to the diagram of FIG. 1. In the example of FIG. 3A, a fast domain 300 and slow domain 320 are shown. Fast domain is shown to include logic and/or other circuitry 302, and slow domain is shown to include logic and/or circuitry 322. Fast domain 300 also includes a flip-flop ("flop") 304 with multiplexor ("mux") 306 coupled as data input to the flop. Multiplexor 306 has two inputs 312 and 314, and also has selector input fast_slow_sync 308 which represents the sync pulse discussed above. Flop 304 is clocked by the clock signal "fast_clk" 310 which represents the "faster" clock of the fast domain 300. Output signal 312 from the flop 304 is fed into flop 324 of slow domain 320. Flop 324 is clocked by the clock signal "slow_clk" 330 which represents the "slower" clock of the slow domain 320. Also depicted in FIG. 3A is a source clock (src_clk) 332 coupled to each of domains 300 and 320. In various embodiments, both the fast_clk 310 and slow_clk 330 may be derived from src_clk 332.

FIG. 3B shows a block diagram illustrating a fast domain 300 to slow domain 320 crossing which generally corresponds to the diagram of FIG. 2. FIG. 3B also depicts logic, circuitry, and signals which are similar to that of FIG. 3A and are similarly numbered. In this example, slow domain 320 includes a flop 344 which receives data in from logic/circuitry 322. Flop 344 is clocked by slow_clk 330. Data out signal 342 from flop 344 is fed into mux 336 which in turn feeds flop 334. Flop 334 has data out 346 which is conveyed to logic/circuitry 302. Mux 336 also receives as input signal 346, and selector input signal fast_slow_sync 308. Flop 334 is clocked by fast_clk 310. As can be seen from FIGS. 3A-3B, a same signal fast_slow_sync 308 is utilized for crossing in both directions—fast domain to slow domain, and vice-versa. Consequently, in one embodiment, a single sync pulse generator may be utilized for generation of the sync pulse.

Figure 4:
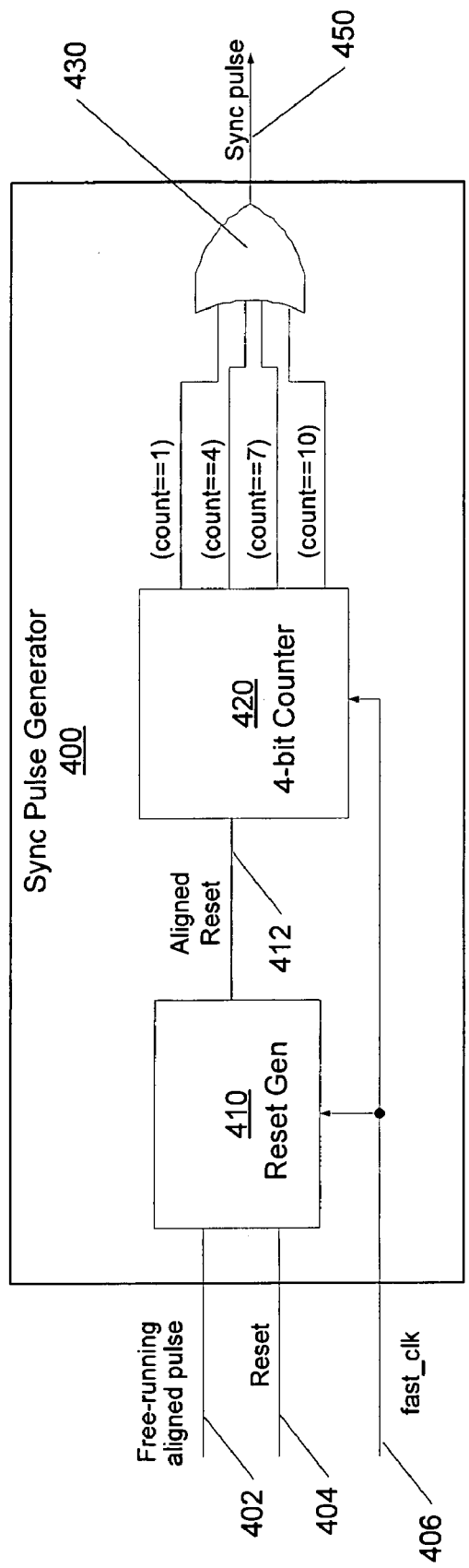
FIG. 4 depicts one embodiment of a pulse generator.

Turning now to FIG. 4, one embodiment of a sync pulse generator 400 using only positive edges as described above is shown. Accompanying FIG. 4 is FIG. 5 which provides a timing diagram for the particular scenario of an 11:4 (or 2.75:1) ratio using only positive clock edges. In this case, the data transfer edges are shown by clock phase numbers 1, 4, 7 and 10 corresponding to vertical dotted lines in FIG. 5. Additionally, the fast and slow clocks are aligned on phase 0. The sync pulse generator of FIG. 4 includes a reset generator 410, counter 420, and logic "OR" gate 430. Reset generator 410 receives as input an aligned pulse signal 402 and reset signal 404. Both reset generator 410 and counter 420 receive clock signal fast_clk 406 which corresponds to the faster clock of the fast domain.

As noted above, both the fast and slow clocks are to be aligned at phase 0. Accordingly, reset generator 410 is configured to receive a reset signal 404 and generate a corresponding aligned reset signal 412 corresponding to phase 0. As will be appreciated, other implementations may be utilized. Aligned reset 412 may then be used to initialize or reset the count of counter 420. In this example, pulse generator 400 is utilized in a clock domain crossing with 11:4 ratio. Therefore, counter 420 is configured to detect when the count (which is incremented by fast_clk 406) is any of the values 1, 4, 7, or 10. In one embodiment, a four bit counter may be used. In the event any one of these values is detected, the counter 420 outputs an indication to this effect which is fed to gate 430. Gate 430 then outputs a sync pulse signal 450 whenever any of these counts is detected.

Figure 5:
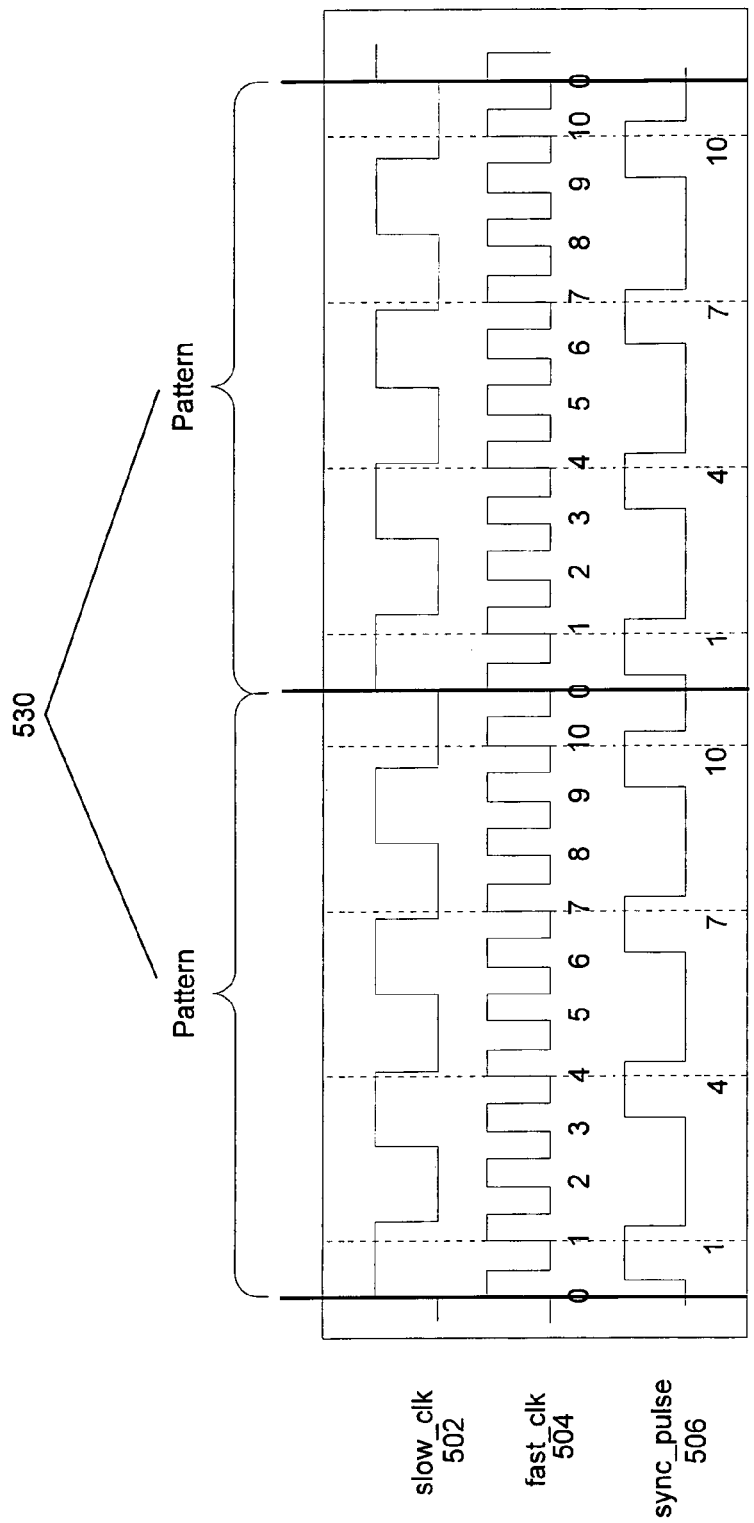
FIG. 5 depicts one embodiment of latching data across clock boundaries.

Referring now to FIG. 5 which provides a timing diagram for the 11:4 ratio discussed above, it can be seen that these counts of 1, 4, 7, and 10, may be used with positive clock edges only to achieve relatively good results in hitting the middle of the slow clock period. FIG. 5 shows a slow_clk signal 502, fast_clk signal 504, and sync_pulse signal 506. Also shown is a repeating pattern 530. Using the pulse generator of FIG. 4, sync_pulse signal 506 is generated. On detection of the first rising edge (numbered edge "0") of the fast_clk signal 504, sync pulse "1" is generated. During assertion of sync pulse "1", the next rising edge of the fast_clk signal 504 can be seen to be near the middle of the first clock cycle of the slow_clk signal 502 shown. Similarly, each of sync pulses 4, 7, and 10 are shown to place the rising edge of the fast_clk signal 504 relatively near the middle of the slow_clk signal 502. Subsequently, the process and count repeats itself.

As shown in FIG. 5, the smallest separation between data transfer and slow_clk capture or latch edge is T (fast_clk period). This smallest separation corresponds to phases 1 and phase 10. So, $t_{margin}$=T, and we could skew the two clocks by almost 1 fast_clk cycle without seeing any failures. While such a margin may be adequate for an 11:4 ratio, the margin goes down for N:M ratios smaller than 2:1. Accordingly, embodiments utilizing negative clock edges to increase the margin may be used.

In alternative embodiments, data transfers may be permitted to take place on a negative edge of the fast_clk signal. Even though data transfers are allowed to take place on the negative edge of fast_clk using such an approach, the rest of the design may still continue to work on the rising edge of fast_clk or slow_clk. As noted above, the ideal data crossing point in time is generally always dead center of a slow clock cycle, and the negative fast_clk edge is sometimes used only to bring the crossing point closer to the ideal.

Figure 6:
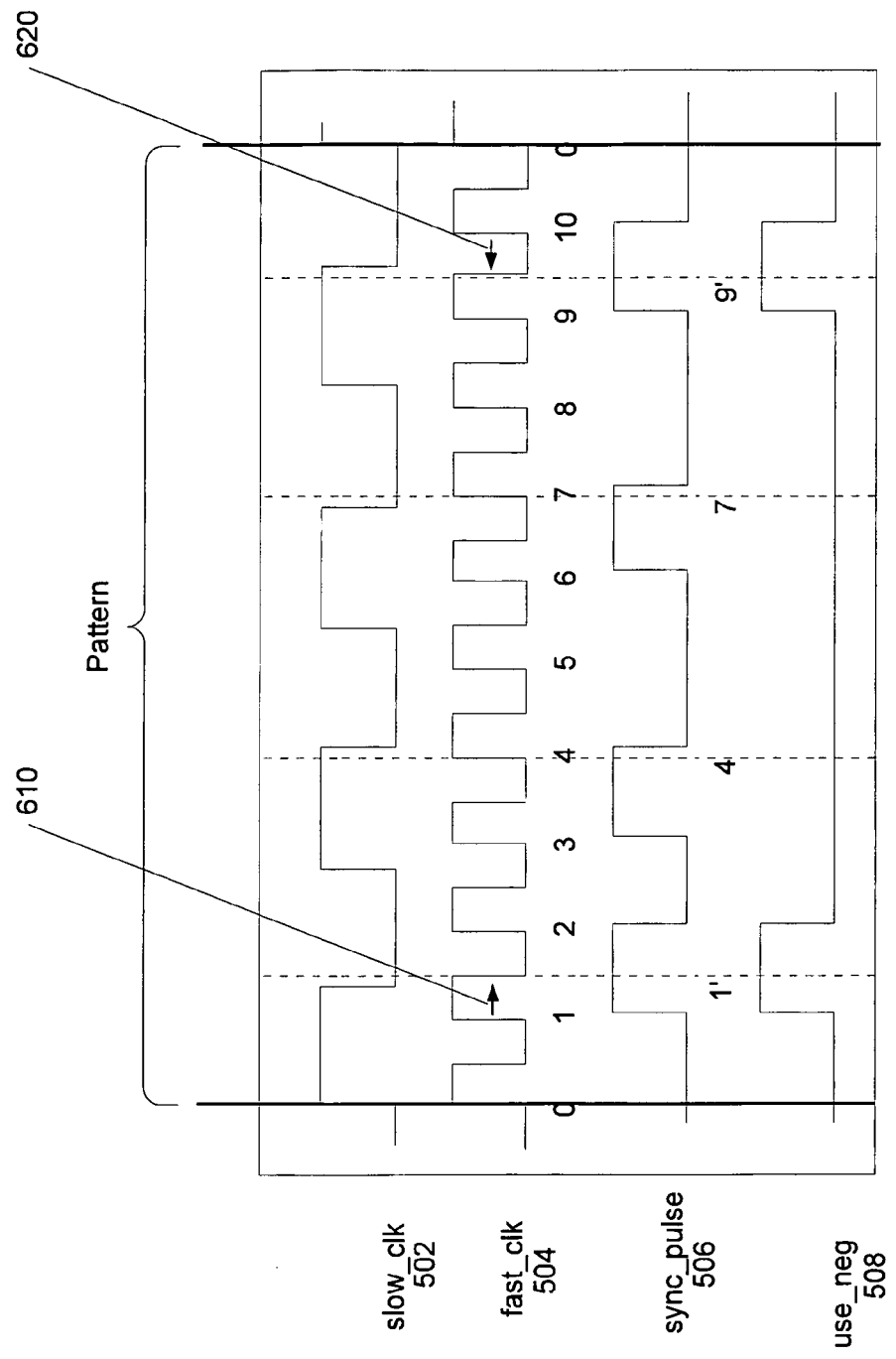
FIG. 6 depicts one embodiment of latching data across clock boundaries.

FIG. 6 illustrates an embodiment corresponding to an 11:4 ratio like that of FIG. 5. In this case, only a single instance of the pattern is shown. However, in this embodiment, an improvement of $t_{margin}$ is obtained. As in FIG. 5, FIG. 6 includes a slow_clk signal 502, fast_clk signal 504, and sync_pulse signal 506. As can be seen, each of these signals 502, 504, and 506 have the same timing as in FIG. 5. However, in this embodiment, a new signal "use_neg" 508 is introduced. When both the signals use_neg 508 and sync_pulse 506 are asserted, the negative edge of the fast_clk signal 506 is used for data capture rather than the positive edge. Therefore, the clock phases used for data transfers have now changed to 1', 4, 7 and 9'. The changes from FIG. 5 to FIG. 6 are noted by reference numerals 610 and 620. In this embodiment, $t_{margin}$ now goes up from T (as in FIG. 5) to 1.25T.

Figure 8:
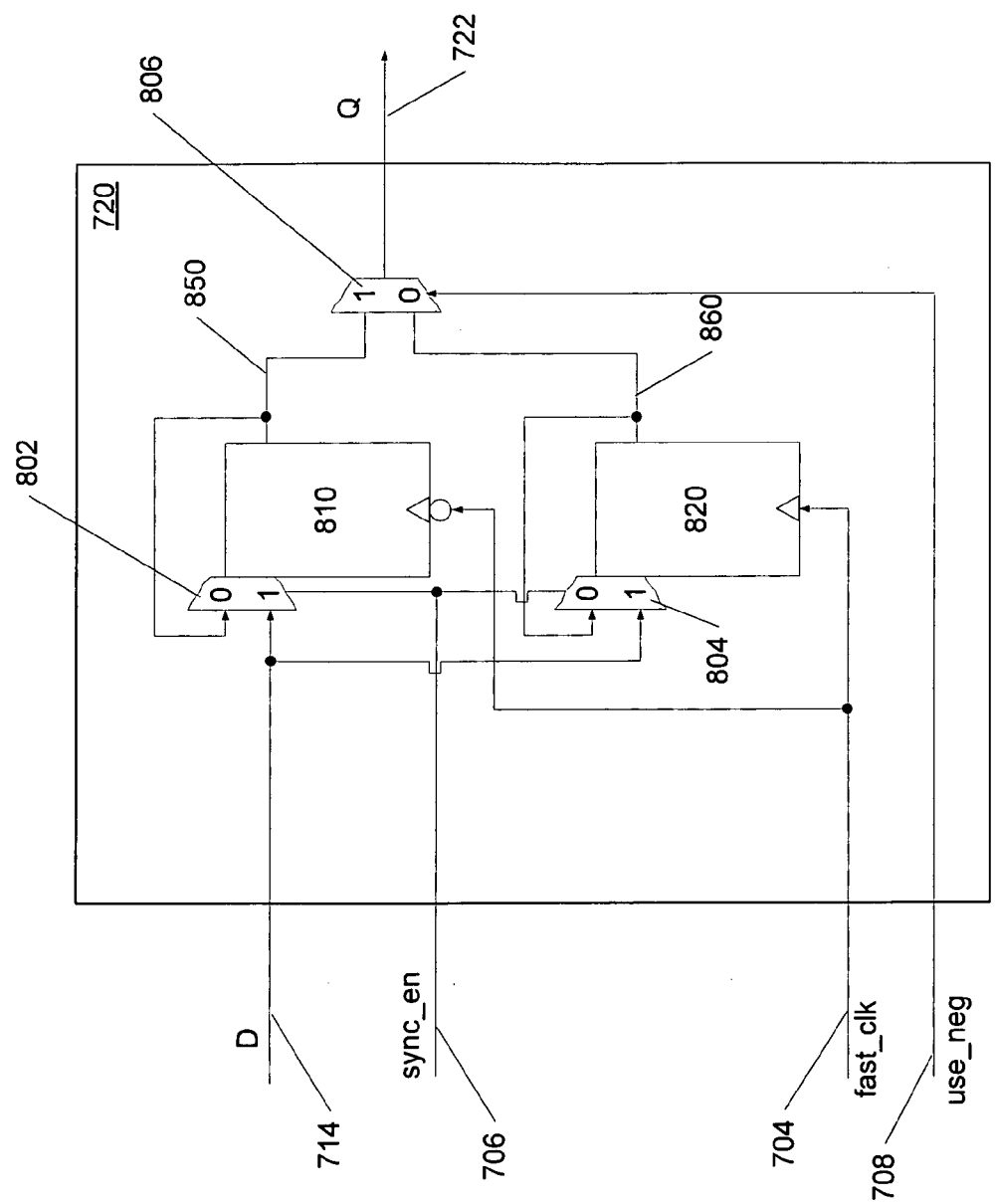
FIG. 8 depicts one embodiment of a data latch.

As noted, a second signal is needed in the embodiment of FIG. 6 to qualify the use of negative edges. This requires a slight modification of the domain crossing boundary, and sync pulse generating circuitry described above. The modifications are illustrated in FIGS. 7A-7B and 8. FIG. 7A shows a fast domain 700 and slow domain 740. Fast domain 700 includes flops 710 and 720, and logic/circuitry 702. Slow domain 740 includes flop 760 to capture data 722 received from fast domain 700. Flop 720 is clocked by fast_clk 704, and flop 760 is clocked by slow_clk 744. Flop 720 receives data in 714 from logic/circuitry 702, and also receives as input signals sync_en 706 and use_neg 708. The sync_en signal 706 represents a sync pulse similar to that discussed above, and the use_neg signal 708 represents a signal indicating when a negative edge of the fast_clk signal 704 may be used. FIG. 7B is a block diagram of the system of FIG. 7A, except a crossing from slow to fast domains is depicted. Similar items are similarly numbered. FIG. 7B is shown to include flops 730 and 770, and slow domain is shown to include flop 750.

Turning now to FIG. 8, one embodiment of the flop 720 of FIG. 7A is shown. In the embodiment of FIG. 8, flop 720 includes flops 810 and 820. Flop 810 is coupled to receive data in from mux 802, and flop 820 is coupled to receive data in from mux 804. Flop 810 provides data out 850, and flop 820 provides data out 860. Mux 806 is shown to include two data inputs, 850 and 860. Mux 802 receives data inputs of signal D 714 (the data output from logic 702 of FIG. 7A, and signal 850 which is fed back from flop 810. Similarly, mux 804 receives data inputs of signal D 714 and signal 860 (which is fed back from flop 820). Both muxes 802 and 804 are coupled to receives as a selector signal sync_en signal 706. Flop 820 is clocked by fast_clk signal 704 and flop 810 is clocked by an inverted version of fast_clk signal 704. Finally, mux 806 is coupled to receive as a selector signal use_neg signal 708. As may be seen, each of flops 810 and 820 alternate latching data "D" 714 on alternating edges of fast_clk 704. Flop 810 latches data on the negative edge of fast_clk 704, and flop 820 latches data on the positive edge of fast_clk 704. The use_neg signal 708 then selects which is output as signal Q 722.

Figure 9:
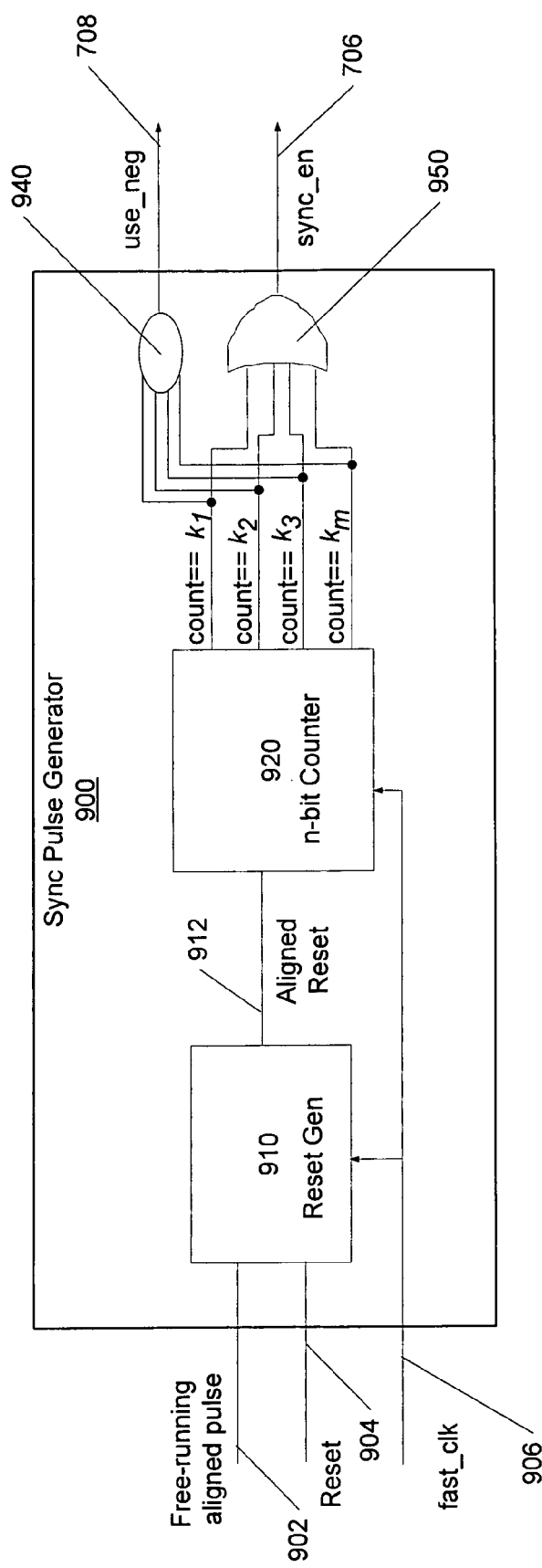
FIG. 9 depicts one embodiment of a pulse generator.

In one embodiment, the use_neg signal 708 is generated by a modified sync pulse generator 900. FIG. 9 depicts one embodiment of a sync pulse generator 900 configured to generate both a sync pulse (sync_en) signal 708 and use_neg signal 708. Similar to the sync pulse generator of FIG. 4, sync pulse generator 900 includes a reset generator 910 and counter 920. Reset generator is coupled to receive an aligned pulse 902 and reset signal 904, and may be configured to generate an aligned reset signal 912 for initializing or resetting the counter 920. In this example, the counter 920 is shown to detect selected counts (k1, k2, k3 . . . km) as a more generalization of the counts that it may be configured to detect. Similar to that of FIG. 4, logic OR gate 950 is provided to detect when any of these selected counts occur and generate a sync_en signal 706 in response. Also included is logic 940 which is used to detect when particular count values occur. For example, referring again to FIG. 6, the use_neg signal was asserted beginning at the rising edges of the fast_clk numbered 1 and 9. Therefore, assuming an 11:4 ratio as shown in FIG. 6, logic 940 of FIG. 9 may be configured to detect counts of 1 and 9. On detecting such a count, the use_neg signal 708 may be asserted which may then results in negative edges of the fast_clk being used as in FIG. 6. Those skilled in the art will appreciate there are numerous way to implement logic 940 to detect any of selected count values.

Figure 10:
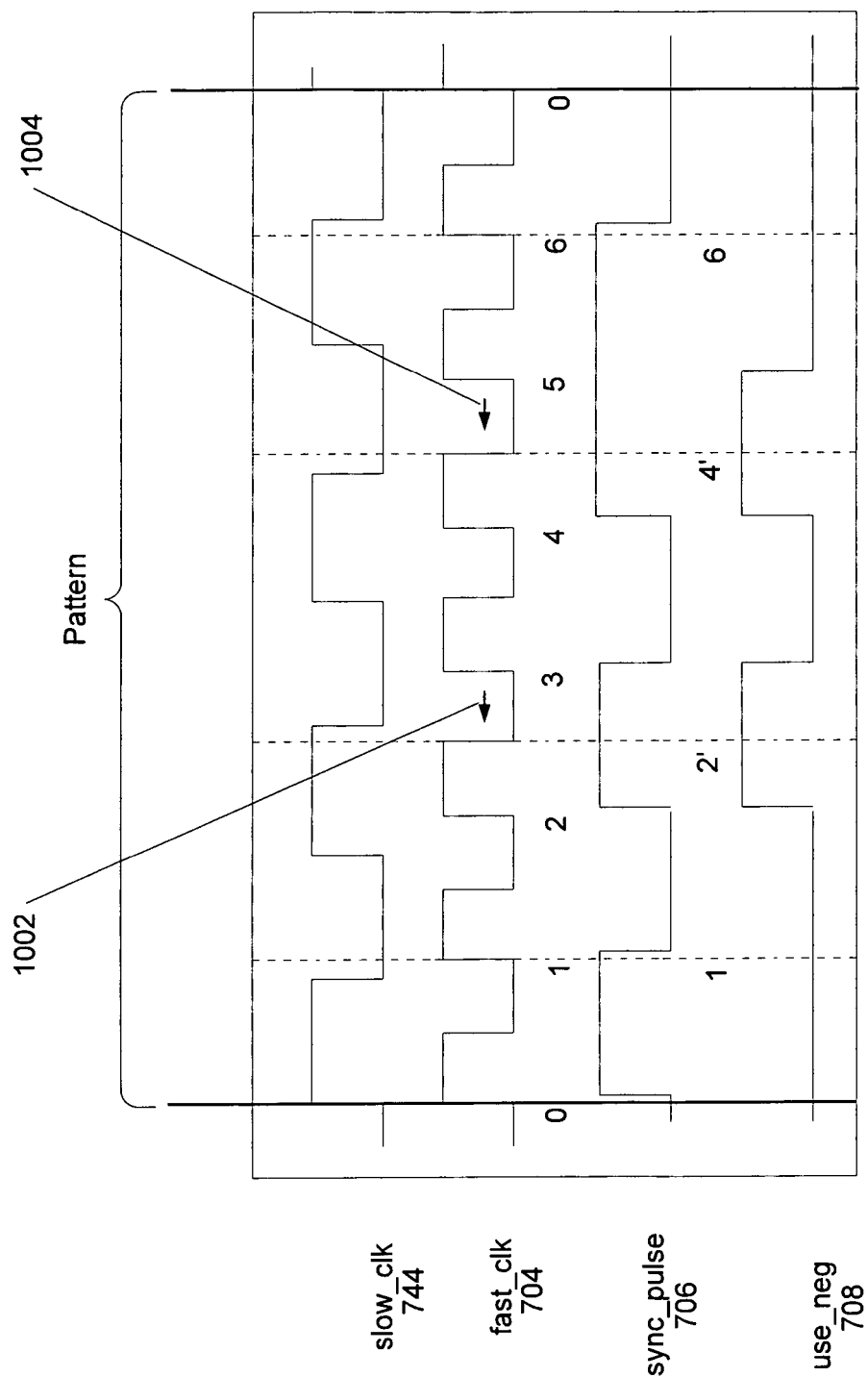
FIG. 10 depicts one embodiment of latching data across clock boundaries.

As a second example, FIG. 10 illustrates using negative edges in a boundary crossing scenario with clock frequencies having a ratio of 7:4 (or 1.75:1). FIG. 10 shows signals slow_clk 744, fast_clk 704, sync_pulse 706, and use_neg 708. IN this case, sync_pulse signal 706 is configured to be asserted on counts of 1, 2, 4 and 6. However, use_neg signal 708 is used to indicate when negative edges of the fast_clk signal 704 may be used to improve the margins discussed above. In this case, use_neg signal 708 is asserted on counts of 2 and 4. As can be seen, this results in data capture at 1002 and 1004. In both cases, data capture occurs more nearly in the middle of the slow_clk signal 744 period than would be the case without the use of the use_neg signal 708. Consequently, the smallest margin is 0.75T. Using only positive edges, it would have been 0.5T. Using the negative edges gives a 50% improvement in this case.

Figure 11:
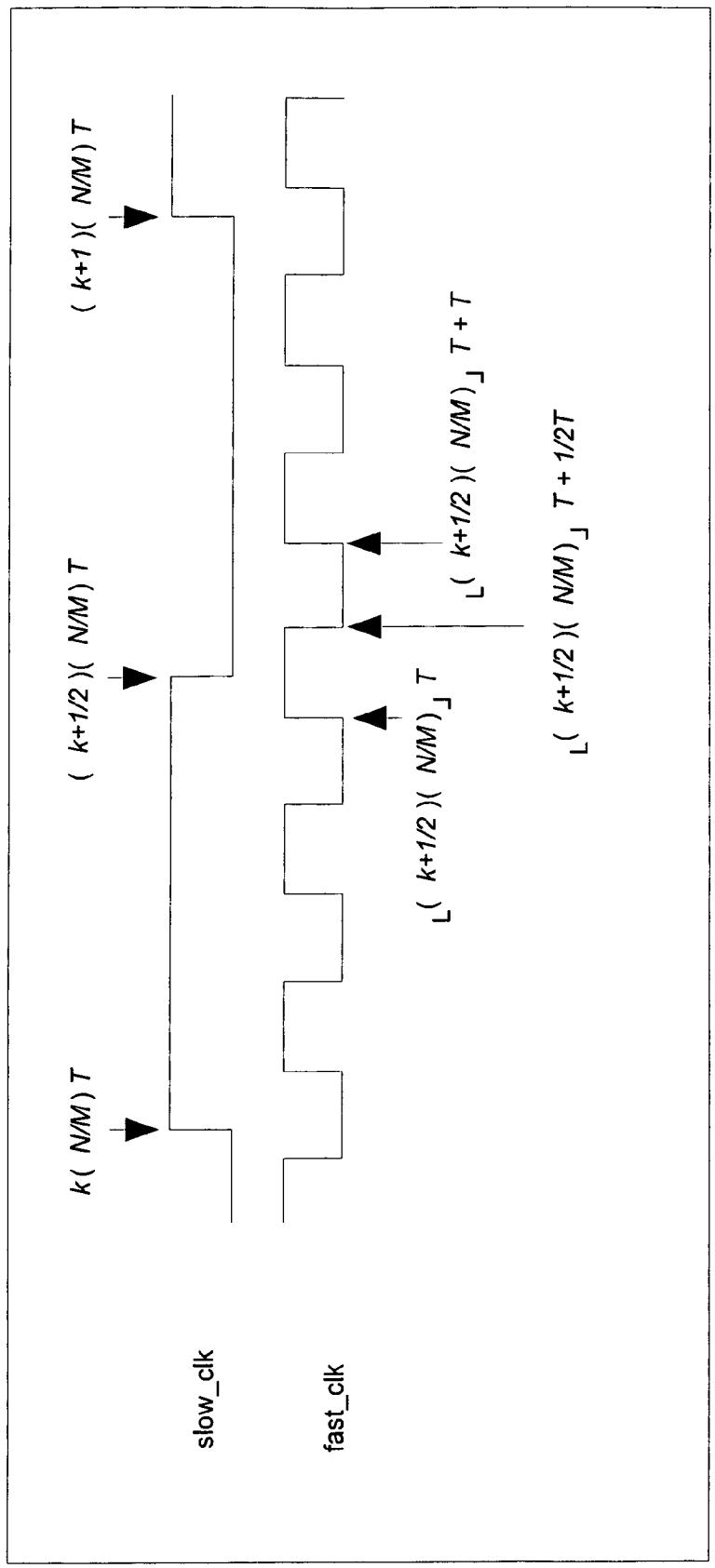
FIG. 11 illustrates one embodiment of a method for choosing data transfer edges.

While all the examples above used M=4, any rational value of N/M will work using the described approaches. What follows is a formalization of the selection of pulse phases for any ratio, and slow clock cycle. The goal as mentioned before is generally to maximize margin for both setup and hold. In one embodiment, $t_{margin}$ may be maximized first, and then $t_{margin,setup}$ and $t_{margin,hold}$ derived. FIG. 11 illustrates how the transfer edges may be chosen. All the times shown in FIG. 11 are relative to the coincident edge when both the rising edges of fast_clk and slow_clk are aligned (theoretically) at time 0.

Let $(k+\frac{1}{2})(N/M)=x$. Then from FIG. 11, the minimum deviation from the ideal point is given by the MIN function MIN $(|xT-\lfloor x \rfloor T|, |xT-\lfloor x \rfloor T-T|, |xT-\lfloor x \rfloor T-\frac{1}{2}T|)$. Select the fast_clk edge that has the smallest deviation from ideal, and hence maximize $t_{margin}$.

The maximum margin for setup (or for hold) time is bounded by the following:

$$\frac{1}{2}T_{slow} \leq t_{margin} \leq \frac{1}{2}T_{slow} - \frac{1}{4}T$$

For even or odd integer N/M, $t_{margin}$ is $\frac{1}{2}T_{slow}$ every cycle.

For fractional values of N/M, the lower bound on $t_{margin}$ is $\frac{1}{2}T_{slow} - \frac{1}{4}T$.

(Using only positive clock edges of the fast clock, for fractional values of N/M, the lower bound on $t_{margin}$ is $\frac{1}{2}T_{slow} - \frac{1}{2}T$.)

Finally, obtain $t_{margin,setup}$ and $t_{margin,hold}$ as follows:

$$t_{margin,setup} = t_{margin} - t_{cq} - t_{skew} - t_{prop} - t_{setup}$$

$$t_{margin,hold} = t_{margin} + t_{cq} - t_{skew} + t_{prop} - t_{hold}$$

Physically constraining the domain crossing flops and muxes to be in a small region may serve to maximize both setup and hold margins.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A data communications system comprising:
   a source clock signal;
   a first clock domain comprising a first clock signal which is derived from the source clock signal, wherein the first clock signal has a first frequency;
   a second clock domain comprising a second clock signal which is derived from the source clock signal, wherein the second clock signal has a second frequency which is less than the first frequency; and
   circuitry configured to generate a pulse indicative of when data transferred between the first clock domain and the second clock domain may be latched;
   wherein said data is only latched when said pulse is asserted and on a given edge of the first clock signal, and wherein said circuitry is configured to generate said pulse such that said given edge occurs at approximately a position corresponding to a middle of a period of the second clock signal;
   circuitry configured to generate an additional pulse, wherein when said pulse is asserted and said additional pulse is not asserted, said data is always latched on a same edge of the first clock signal, either a positive edge or a negative edge.

2. The system as recited in claim 1, wherein said data is latched on only a positive or negative edge of the first clock signal, but not both.

3. The system as recited in claim 1, wherein when both said pulse and said additional pulse are asserted, said data is latched on an edge different from said same edge.

4. The system as recited in claim 1, wherein both the first frequency and the second frequency are an integer multiple of a frequency of the source clock signal, and the first frequency is not an integer multiple of the second frequency.

5. The system as recited in claim 1, wherein said circuitry includes a sync pulse generator configured to generate said pulse, wherein said sync pulse generator includes a counter configured to repeatedly count a given number of cycles of the first clock signal and detect when selected counts occur.

6. The system as recited in claim 5, wherein a ratio of said first frequency to said second frequency is N:M, wherein said given number of cycles corresponds to N, and the number of selected counts detected corresponds to M.

7. The system as recited in claim 6, wherein said circuitry is further configured to detect selected values of the selected counts and generate an additional pulse in response thereto.

8. A method comprising:
   receiving a source clock signal;
   generating a first clock signal with a first frequency in a first clock domain, wherein the first clock signal is derived from the source clock signal;
   generating a second clock signal with a second frequency in a second clock domain, wherein the second clock signal is derived from the source clock signal, and wherein the second frequency is less than the first frequency;
   generating a pulse indicative of when data transferred between the first clock domain and the second clock domain may be latched;
   wherein said data is only latched when said pulse is asserted and on a given edge of the first clock signal, and wherein said method further comprises generating said pulse such that said given edge occurs at approximately a position corresponding to a middle of a period of the second clock signal;

generating an additional pulse, wherein when said pulse is asserted and said additional pulse is not asserted, said data is always latched on a same edge of the first clock signal, either a positive edge or a negative edge.

9. The method as recited in claim 8, wherein said data is latched on only a positive or negative edge of the first clock signal, but not both.

10. The method as recited in claim 8, wherein when both said pulse and said additional pulse are asserted, said data is latched on an edge different from said same edge.

11. The method as recited in claim 8, wherein both the first frequency and the second frequency are an integer multiple of a frequency of the source clock signal, and the first frequency is not an integer multiple of the second frequency.

12. The system as recited in claim 8, wherein generating said pulse comprise repeatedly counting a given number of cycles of the first clock signal and detecting when selected counts occur.

13. The method as recited in claim 12, wherein a ratio of said first frequency to said second frequency is N:M, wherein said given number of cycles corresponds to N, and the number of selected counts detected corresponds to M.

14. The method as recited in claim 13, wherein further comprising detecting selected values of the selected counts and generating an additional pulse in response thereto.

15. An apparatus for use in a multiple clock domain system, the apparatus comprising:

circuitry configured to generate a first clock signal derived from a source clock signal, wherein the first clock signal has a first frequency; and a pulse generation unit coupled to receive the first clock signal, wherein the pulse generation unit is configured to:

repeatedly count a given number of cycles of the first clock signal; and generate a pulse indicative of when data being transferred between clock domains may be latched;

wherein said data is only latched when said pulse is asserted and on a given edge of the first clock signal, and wherein said circuitry is configured to generate said pulse such that said given edge occurs at approximately a position corresponding to a middle of a period of the second clock signal;

circuitry configured to generate an additional pulse, wherein when said pulse is asserted and said additional pulse is not asserted, said data is always latched on a same edge of the first clock signal, either a positive edge or a negative edge.

16. A data communications system comprising:

a source clock signal;

a first clock domain comprising a first clock signal which is derived from the source clock signal, wherein the first clock signal has a first frequency;

a second clock domain comprising a second clock signal which is derived from the source clock signal, wherein the second clock signal has a second frequency which is less than the first frequency; and circuitry configured to generate a pulse indicative of when data transferred between the first clock domain and the second clock domain may be latched;

wherein said data is only latched when said pulse is asserted and on a given edge of the first clock signal, and wherein said circuitry is configured to generate said pulse such that said given edge occurs at approximately a position corresponding to a middle of a period of the second clock signal;

wherein said circuitry includes a sync pulse generator configured to generate said pulse, wherein said sync pulse generator includes a counter configured to repeatedly count a given number of cycles of the first clock signal and detect when selected counts occur;

wherein a ratio of said first frequency to said second frequency is N:M, wherein said given number of cycles corresponds to N, and the number of selected counts detected corresponds to M;

wherein said circuitry is further configured to detect selected values of the selected counts and generate an additional pulse in response thereto.

17. A method comprising:

receiving a source clock signal;

generating a first clock signal with a first frequency in a first clock domain, wherein the first clock signal is derived from the source clock signal;

generating a second clock signal with a second frequency in a second clock domain, wherein the second clock signal is derived from the source clock signal, and wherein the second frequency is less than the first frequency;

generating a pulse indicative of when data transferred between the first clock domain and the second clock domain may be latched;

wherein said data is only latched when said pulse is asserted and on a given edge of the first clock signal, and wherein said method further comprises generating said pulse such that said given edge occurs at approximately a position corresponding to a middle of a period of the second clock signal;

wherein generating said pulse comprise repeatedly counting a given number of cycles of the first clock signal and detecting when selected counts occur;

wherein a ratio of said first frequency to said second frequency is N:M, wherein said given number of cycles corresponds to N, and the number of selected counts detected corresponds to M; and wherein further comprising detecting selected values of the selected counts and generating an additional pulse in response thereto.

* * * * *

UNITED STATES PATENT AND TRADEMARK OFFICE
CERTIFICATE OF CORRECTION

PATENT NO. : 7,733,130 B2  Page 1 of 1
APPLICATION NO. : 12/043935
DATED : June 8, 2010
INVENTOR(S) : Mahmudul Hassan et al.

It is certified that error appears in the above-identified patent and that said Letters Patent is hereby corrected as shown below:

On sheet 3 of 11, in Figure 3A, line 1, above FIG. 3A, delete "REPLACEMENT SHEET".

Signed and Sealed this
Second Day of August, 2011

David J. Kappos
*Director of the United States Patent and Trademark Office*